ELECTRODE MOUNT AND METHOD OF MANUFACTURE THEREOF

Filed March 30, 1962 2 Sheets-Sheet 1

INVENTORS
KENNETH N. KAROL &
EARLE S. THALL
BY Thomas R. Webb
AGENT

ELECTRODE MOUNT AND METHOD OF MANUFACTURE THEREOF

INVENTORS
KENNETH N. KAROL &
BY EARLE S. THALL
Thomas R. Webb
AGENT

United States Patent Office 3,300,677
Patented Jan. 24, 1967

3,300,677
ELECTRODE MOUNT AND METHOD OF MANUFACTURE THEREOF

Kenneth N. Karol, Teaneck, and Earle S. Thall, West Orange, N.J., assignors to Radio Corporation of America, a corporation of Delaware Filed Mar. 30, 1962, Ser. No. 183,861
15 Claims. (Cl. 315—3.5)

The present invention relates to electrode mounts and methods of manufacture thereof, and is particularly applicable to mounting a helix in a glass envelope in a traveling wave tube.

In one type of helix type traveling wave amplifier tube, an elongated metallic helix is mounted coaxially within an elongated tubular envelope and an electron gun is mounted at one end of the helix, within an enlarged extension of the envelope, to project an electron beam coaxially through the helix to a collector at the other end thereof. RF coupling means are provided at the two ends of the helix, for coupling an RF signal to the helix to initiate traveling waves thereon for interaction with the beam, and for removing the amplified RF signal from the helix.

In order to withstand temperatures of the order of 500° C. during bake-out and other processing, the tube components must be of refractory materials. The envelope is usually made of a hard low-loss glass or ceramic. The helix is usually made of tungsten wire. In order to achieve the required electrical characteristics, it is necessary that the helix be manufactured and assembled in the envelope to a high state of precision, that is, it must be wound with specified diameter and pitch, which must be maintained during the assembly and subsequent use of the traveling wave tube. To meet some environmental requirements, it is necessary to secure the helix in some manner that is insensitive to external force loadings. Moreover, the securing means should not degrade the electrical parameters of the traveling wave tube. For example, a reduction in gain could occur due to excessive dielectric loading of the helix by the securing means. Thus, the problem is to mount the helix as accurately and securely as possible with a minimum of dielectric loading.

Present envelope construction usually involves an integral tube and bulb combination which mainly houses the helix and the electron gun. Two basic methods are used to secure the helix within the tube. In one method, the helix is positioned within a cage of rods, usually ceramic, which in turn is mounted within the envelope. In the other method, the helix is embedded directly in three longitudinal ribs forming portions of the inner wall of an internally fluted glass tube forming part of the envelope. In the cage method, jigs are used to hold the rods and helix in position during assembly, which may involve applying a glazing material to the ceramic rods and heating to cause the glazing material to flow about and fuse to the helix turns at the areas of contact. A variant of the cage technique is the use of spring clamps about the rods to press them against the helix. In the glass-embedded method, the helix is placed within an internally-fluted glass tube, the assembly is heated to a temperature near the softening point of the glass, and the ribs are depressed into contact with the helix, either by external jigs or by a partial vacuum within the tube.

In the manufacture of traveling wave tubes with these two methods, rates of shrinkage (due to rejected parts) of 30 to 50 percent are not uncommon. The reasons for these high shrinkage rates can be understood from a more detailed explanation of the two methods. In the glass-embedding method, the helix is first wound on a winding mandrel, its ends being firmly attached to the mandrel. The helix is cleaned and fired to set the helix to minimize spring-out upon release from the mandrel, and then is removed from the winding mandrel. The helix is handled through various operations such as cutting to size, plating and the welding of parts to it. Then a smaller mandrel is placed within the helix and a spacer ribbon is entwined in the coils thereof in an attempt to re-achieve the "as wound" condition of the helix and also to limit the embedding of the helix turns in the glass ribs as the latter soften and move inward. The helix, mandrel and spacer ribbon are then inserted within a tubular glass envelope section having three internal ribs. The envelope section is placed within a two-part jig having three shrinking ridges registering with the three envelope ribs and the assembly is positioned within an oven and brought to a temperature near the softening point of the glass. It is hoped that the upper part of the jig will, under the influence of gravity, move the glass the precise amount to just barely and uniformly embed the helix in the glass ribs. The allowable embedding depth for a .010 inch diameter helix wire would be about .002 inch. After the helix is embedded in the glass, the assembly is cooled, and the mandrel and spacer ribbon are removed, as by an acid bath.

In the glass-embedding method described it is difficult to accurately control the depth of embedding. Often, the turns of the helix are embedded so deep that the dielectric loading of the helix is beyond the allowable tolerance. Moreover, since the glass is heated only to the softening point, the glass does not fuse or bond to the helix turns, and hence, the helix tends to shrink away from the glass ribs as it cools.

In the ceramic-rod-cage method of mounting the helix, the rods should be secured in some way to the helix turns to prevent looseness and displacement of the rods under vibration or jarring of the tube. A method of securing the rods to the helix by a glaze was described on pages 24–27 of a paper entitled "The Use of Powdered Glass as a Bonding Medium in Traveling Wave Tube Construction," by E. G. Olsen, in Proc. of the Third National Conference on Tube Techniques, September 12–14, 1956. Briefly, in this method, a narrow ribbon of a glass mixture in suspension is sprayed onto each ceramic rod and pre-fired at about 950° C. Then, the helix is mounted within an array of three such rods held in a jig with the glass ribbons contacting the helix, and the assembly is fired in a furnace between 1200° C. and 1250° C. for 30 minutes to fuse the ribbons to the helix. In the finished assembly, each helix turn is in contact with each ceramic rod with a glass fillet surrounding the area of contact and bonding the two together. The width of each fillet is about equal to the wire diameter, which results in excessive dielectric loading which loading it is desired to reduce.

An object of the present invention is to provide a new and improved electrode-insulator mount, and method of assembly thereof.

Another object is to provide a new and improved helix-insulator mount for an electron tube.

A further object is to provide a new and improved method of bonding a helix to a plurality of supporting insulating ribs or rods.

In one embodiment of the present invention, a refractory metal electrode, such as a traveling wave tube helix, is bonded to a plurality of longitudinal external parts or elements of refractory insulating material, such as glass, by means of upstanding pedestals, of the material of the elements, integral with the elements and fused to the helix turns, with a minimum of dielectric loading of the helix by the insulating material. When three elements are used, the pedestals are formed by: (a) supporting the elements in a circular array having an inscribed diameter slightly greater than the diameter of the metal helix; (b) positioning the helix within this array; (c) creating an inert or substantially non-oxidizing atmosphere or a vacuum about the array; and (d) passing sufficient current through the helix for only a small fraction of a second to heat the helix to a temperature above the minimum fusing temperature of the insulating material, causing the helix to expand into contact with all three elements and to heat relatively small surface portions only of the elements to fusing temperature, to fuse these surface portions to the helix turns without softening the major portions of the elements. In the case of glass, the assembly is preferably pre-heated slowly to the annealing range before the current pulse is applied to the helix, and is cooled very slowly after the fusing step, at least to the strain point of the glass, to anneal the glass.

The novel method of bonding a metal member to a refractory insulating member by passing a high-current pulse of short duration through the metal member to fuse the surface portion only of the insulating material to the metal member can also be used in other applications, such as lead-in structures including a glass-to-metal seal, in those cases where it is convenient to pass a current through the metal member.

Figure 2:
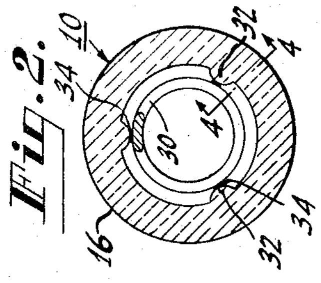
FIG. 2 is a transverse section view taken on line 2—2 of FIG. 1.
Figure 1:
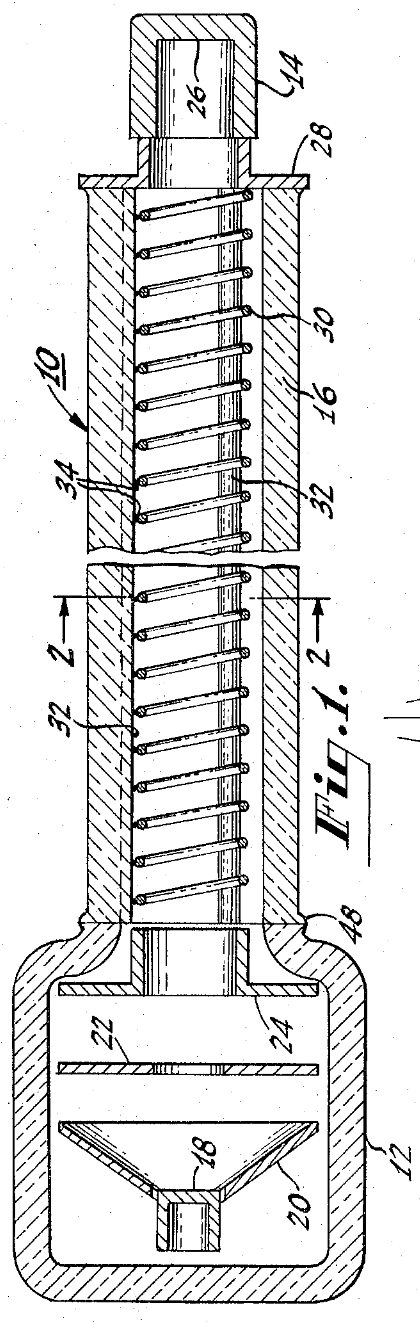
FIG. 1 is an axial section view of a traveling wave tube embodying the invention.

Referring to FIGS. 1 to 4, the numeral 10 designates an elongated traveling wave tube envelope made up of an electron gun portion 12 at one end, a collector portion 14 at the other end, and an intermediate hollow cylindrical helix portion 16. The gun portion 12 and helix portion 16 are made of refractory insulating materials, such as glass or ceramic, to insulate the gun electrodes and helix turns. A conventional electron gun, which may include a cathode 18, cathode shield or focusing electrode 20, accelerating electrode 22 and drift tube electrode 24, is mounted by known means (not shown) in the gun portion 12 substantially in coaxial alignment with the helix portion 16. The collector portion 14 may include a cup-shaped metal collector 26 which is sealed to the helix portion 16, either directly or by an intermediate flanged metal ring 28 as shown. An elongated refractory metal helix 30, of uniform diameter and desired pitch, is substantially coaxially mounted in fixed relation within the helix portion 16.

In a preferred embodiment of the invention, the helix 30 is rigidly secured or fixed to the helix portion 16 of the envelope at three points on each turn, preferably equally spaced from each other. To provide such a mount for the helix, the inner surface of the portion 16 is provided with three longitudinal ribs 32, preferably about 120° apart, as shown in FIG. 2. Each turn of the helix 30 is bonded to the three ribs 32, with a slight spacing therebetween, by means of short pedestals 34 of the envelope material, each of which is integral with one of the ribs 32 and fused to the helix turn. The pedestals 34 may be formed and bonded to the helix turns in the following manner.

A metal helix 30 of desired material, wire size, helix diameter and pitch, or turns per inch, which are usually dictated by the electrical requirements of the traveling wave tube, is positioned within a section 16 of internally fluted glass, for example, having three longitudinal ribs 32 with an inscribed circle diameter slightly larger than the helix diameter. The glass section 16 may be supported in a horizontal position with the three ribs 32 oriented as shown in FIG. 2 and the helix resting initially by gravity on the two lower ribs and spaced slightly from the upper rib, by means of a jig, such as the two-part nest 36 shown in FIGS. 5 and 6, which also serves as a heat sink during the heating and cooling cycle.

The ends of the helix 30 are connected to a source of 60 cycle A.C. for direct heating of the helix during the process of joining the helix to the glass ribs 32. Preferably, the assembled helix, glass section and supporting jig are enclosed within a substantially non-oxidizing atmosphere, such as nitrogen, throughout the heating and cooling steps to minimize oxidation of the helix.

Figures 7, 9, 10:
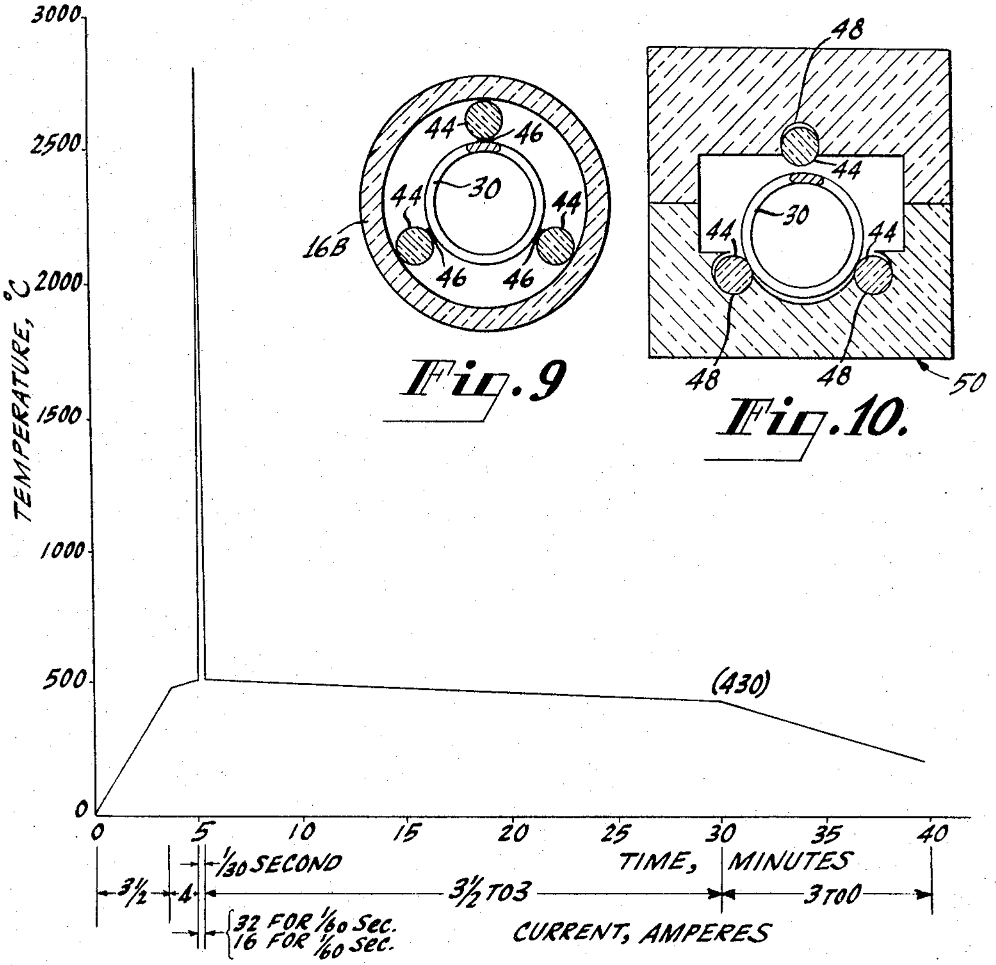
FIG. 7 is an example of a temperature-current-time cycle for bonding a helix to an internally-fluted glass envelope according to the invention.
FIG. 9 is a view similar to FIG. 2 of another form of traveling wave tube embodying the invention.
FIG. 10 is a transverse sectional view of the helix-rod assembly of FIG. 8 in a supporting jig or nest.

A typical temperature cycle is shown in FIG. 7 for an example in which a tungsten helix of 10 mils diameter wire, 150 mils outside diameter and 33.8 turns per inch is bonded to the ribs of a fluted section of Corning 7070 borosilicate glass having a strain point of 455° C., an annealing point of 495° C., a softening point of about 746° C., a working point of 1100° C., and a coefficient of thermal expansion of $32\times10^{-7}/°$ C. The working point is the minimum fusing temperature, above which the glass will fuse to other materials. The thermal coefficient of the tungsten helix is $44.3\times10^{-7}/°$ C. at 20° C., $51.7\times10^{-7}/°$ C. at 1000° C., and $72.4\times10^{-7}/°$ C., at 2000° C., and thus, is always higher than that of the glass.

As shown in FIG. 7, the glass is first slowly heated from room temperautre to about 500° C., by passing a current of 3½ to 4 amperes, r.m.s., through the helix for about 5 minutes. At this temperature, the glass is between the strain point and the softening point (in the annealing range) and in a condition to withstand a short high temperature pulse without cracking or other damage. With the glass section at 500° C., the helix current is suddenly switched to about 32 amperes for one cycle, and then drops to about 16 amperes for the next cycle. Then the current is suddenly switched to about 3½ amperes, which is gradually reduced to about 3 amperes over a cooling and annealing period of about 25 minutes, at which time the section is below the strain point of the glass, and can be allowed to cool more rapidly to room temperature.

During the high current pulse, the helix is suddenly raised to a temperature between 2000 and 3000° C., well above the working point of the glass. Heat is transmitted, principally by conduction, from the hot helix to the surface portions of the glass ribs in contact with the helix turns, the two lower ribs at first, raising the temperature of these surface portions above the working point of the glass, so that they fuse to the helix turns. Simultaneously, due to its higher thermal coefficient and wider temperature change, the helix expands in diameter into contact with the upper glass rib, and fuses surface portions thereof to the helix turns. Then, as the helix suddenly cools, at the end of the high current pulse, the helix contracts and, due to the bond which has been formed to the upper rib, tends to pull away from all three ribs thus pulling out portions of the glass of the three ribs to create the short pedestals 34 shown in FIGS. 1–4. Since the glass which forms the pedestals 34 comes from the glass rib 32, a slight depression is formed around the base of each pedestal which increases the effective height of the pedestal. Normally, the upper pedestal 34 will be slightly longer or higher than the other two, which may be tolerated in most cases. If it is desired to produce pedestals of equal length, the process may be repeated with the section 16 and the jig rotated 120° or 180°, with somewhat lower or shorter current pulse.

An advantage of this process, over the conventional process of embedding the helix turns in the glass ribs by placing the assembly in a furnace and slowly heating and cooling the entire assembly, it that during the entire process most of the glass making up the glass section 16 remains below its softening point, and hence, is solid and self-supporting. This is true because the contact between the helix turns and the glass is limited to relatively small surface areas only, and the duration of the high current pulse is so short that the remainder of the glass is not raised to its softening point. Thus, the helix can be satisfactorily mounted in the fluted glass tubing without the use of a helix mandrel, which is used in most processes heretofore used. However, if desired, for more precise spacing and alignment of the helix turns, a mandrel may be used in the present process. Such a mandrel must be of an insulating material, to avoid short-circuiting the helix turns, having a fusing temperature substantially higher than that of the glass used, to avoid bonding to the helix. Moreover, the mandrel should be supported independently of the glass section to prevent sagging due to its weight when the glass is fused.

Figure 4:
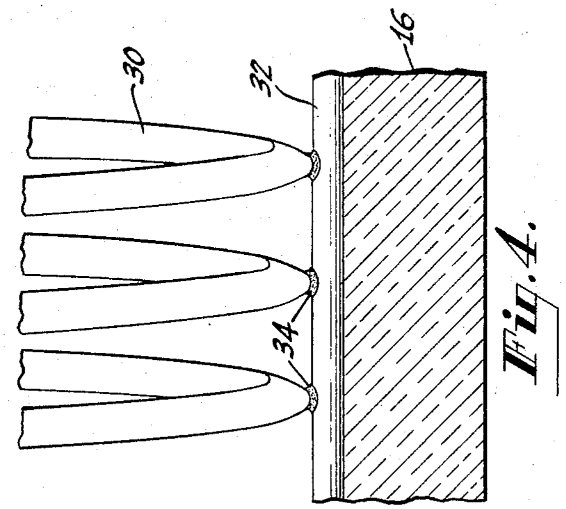
FIG. 4 is an enlarged detail section view taken on line 4—4 of FIG. 2.
Figure 3:
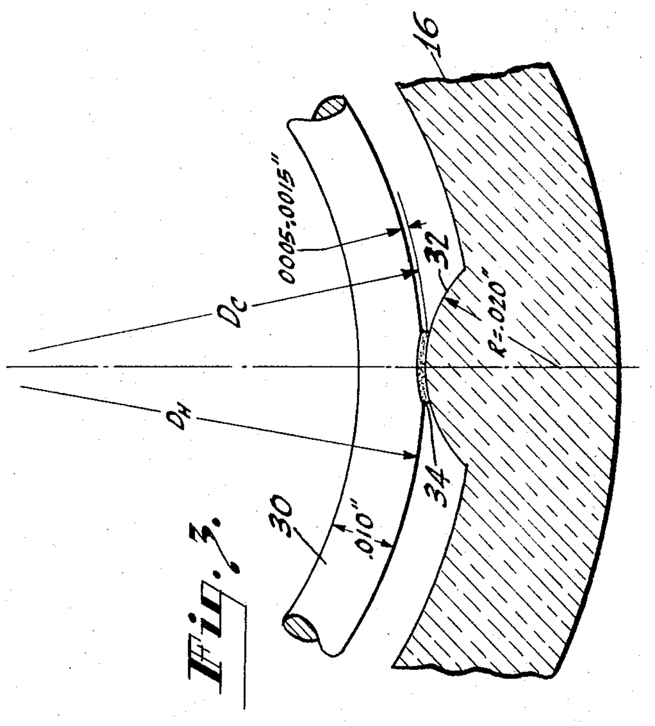
FIG. 3 is an enlarged detail section view, in the plane of FIG. 2, of one of the helix-rib connections.

The outer diameter $D_H$ of the helix 30 and the inscribed circle diameter $D_C$ of the ribs 32 at room temperature should differ by about one mil, so that the height of the pedestals 34 will be about a half mil. The general shape of the pedestals is shown in FIGS. 3 and 4. Preferably, the conditions are controlled to produce pedestals having a width, as shown in FIG. 4, less than the wire diameter of the helix 30, to minimize dielectric loading of the helix. It will be understood that the amount of dielectric loading of the helix by the pedestals 34 is much less than the loading of a helix which is either embedded into the ribs of a fluted glass tubing or bonded with another material.

Figure 5:
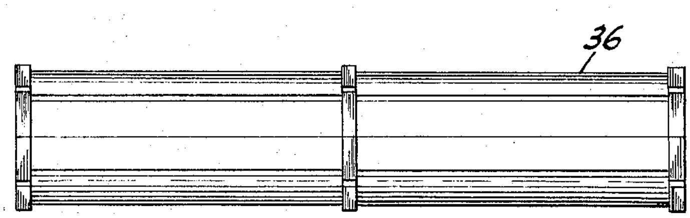
FIGS. 5 and 6 are side and end views, respectively, of a nest or jig that may be used to support the envelope during the mounting of the helix therein.
Figure 6:
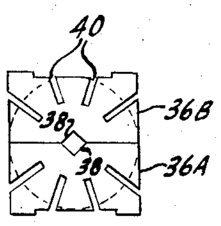

The two-part jig or nest 36 shown on a reduced scale in FIGS. 5 and 6 is made up of two identical halves 36A and 36B, each of which is an elongated block of rectangular cross section with a central V-groove 38 in one surface adapted to mate with the like groove in the other block to form a channel of square cross section to receive and support the tubular section 16. The blocks 36A and 36B are made of a heat-conducting refractory material, such as aluminum silicate lava, and are formed with radial slots 40 to prevent cracking during manufacture. As shown, the nest 36 is generally cylindrical to create a uniform heat sink for the glass section.

Other materials may be used in FIGS. 1–4 instead of the tungsten and 7070 glass of the above example. For example, the helix 30 may be of molybdenum, having a thermal expansion coefficient of 53, 56 and $72\times10^{-7}/°$ C. at 20°, 1000° and 2000° C., respectively. Other glasses may be used for the section 16, such as Corning 1723 aluminosilicate glass having a strain point of 670° C., an annealing point of 708° C., a softening point of 912° C., a working point of 1176° C., and a thermal expansion coefficient of $46\times10^{-7}/°$ C. While it is preferred that the coefficient of thermal expansion of the helix be greater than that of the glass, as in the examples given above, in order to facilitate the expansion of the helix into contact with the glass, the thermal coefficient of the helix could be equal to or even somewhat less than that of the glass. In this case, the helix would still expand more than the glass, and engage the latter, because of the greater temperature change of the helix.

Figure 8:
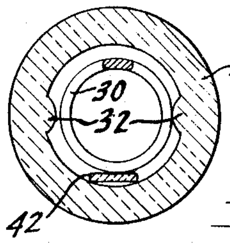
FIG. 8 is a transverse sectional view similar to FIG. 2 illustrating a mofiided method of assembly.

The helix 30 may be bonded by the method of the present invention to a fluted glass envelope section 16A having two diametrically opposite ribs 32, as shown in FIG. 8, instead of three ribs. In this case, section 16A may be supported in a jig or nest with the two ribs 32 in a horizontal plane, with the helix 30 supported on a refractory insulating spacer strip 42, which has a higher softening temperature than the glass, interposed between the helix and the inner wall of section 16A. Initially, the helix 30 will normally be in contact with one of the ribs 32 and be spaced from the other rib. The operation of bonding the helix to the two ribs 32 and forming pedestals 34 is essentially the same as that described above for three ribs, except that in this case the two pedestals will usually have nearly the same height. The spacer strip 42 can be easily removed after the glass-to-metal bonding operation because the helix tends to shrink away from the spacer strip on cooling.

The helix may be deliberately coated with a thin oxide layer, such as chromium oxide as formed on a chromium coating or by the oxide such as tungsten oxide of the helix metal itself, to facilitate the fusing of the glass to the helix. However, good glass-to-helix bonds have been made without any deliberate attempt at coating the helix with a second metal or an oxide layer.

The helix-to-glass bonding process described above may be varied by placing the helix-glass assembly in an oven to pre-heat the assembly slowly to the annealing range, applying the short current pulse to the helix to make the bond, and then annealing the glass by allowing the oven temperature to drop very slowly.

The helix 30 may also be mounted in either an insulating or metal envelope section by means of a plurality of glass or ceramic rods having integral pedestals. FIG. 9 shows an envelope section 16B containing a helix 30 joined to three ceramic rods 44 by pedestals 46 of the ceramic rod material. FIG. 10 shows the three ceramic rods 44 mounted in three parallel grooves 48 in a two-part jig or nest 50, e.g. of lava, with the helix 30 resting on the two lower rods and spaced one or two mils from the upper rod. For example, the helix may be of tungsten and the rods 44 may be made of a ceramic known as "Alsimag 576" containing about 85% $Al_2O_3$, having a softening point about 1440° C., a melting point of about 2000° C., and a thermal expansion coefficient of $77\times10^{-7}/°$ C. average from 20° to 750° C. When bondinng the helix turns to ceramic rods, it is not necessary to pre-heat the ceramic material. Instead, satisfactory bonds have been made by applying a high current pulse of short duration to the helix, starting with the helix and rods at room temperature, to momentarily raise the temperature of the surface portions of the rods to about 2800° C., which is above the melting point and the minimum fusing temperature of the ceramic material. The quick bonding of the helix to ceramic material requires somewhat higher current and/or longer pulse length than for bonding to glass.

With the parts assembled as shown in FIG. 10, the application of the current pulse causes the helix 30 to expand into contact with the upper rod 44, to fuse the surface portions of all three rods, and draw out pedestals 46 of the ceramic material on cooling and contracting, as in the case of the glass ribs described above.

What is claimed is:

1. The method of bonding a refractory metal member having a given outer dimension to a plurality of external elongated parts of refractory insulating material, comprising the steps of:

(a) supporting said parts in an array having a minimum inscribed circle diameter slightly greater than said outer dimensions of said metal member;

(b) positioning said metal member within said array; and (c) momentarily heating said member to a temperature above the minimum fusing temperature of said material, by passinng a high current through said member for only a small fraction of a second, to cause said member to expand into contact with and heat relatively small surface portions only of said parts to fusing temperature, thereby fusing said surface portions to said member without softening the major portions of said parts.

2. The method of bonding a cylindrical refractory metal member to three external elongated parts of refractory insulating material, comprising the steps of:
(a) supporting said parts in a circular array having an inscribed circle diameter slightly greater than the outer diameter of said member;
(b) positioning said metal member within said array; and
(c) momentarily heating said member to a temperature above the minimum fusing temperature of said material, by passing a high current through said member for only a small fraction of a second, to cause said member to expand into contact with and heat relatively small surface portions only of said parts to fusing temperature, thereby fusing said surface portions to said member without softening the major portions of said parts.

3. The method of bonding a cylindrical refractory metal member to three external elongated parts of glass, comprising the steps of:
(a) supporting said parts in a circular array having an inscribed circle diameter slightly greater than the outer diameter of said member;
(b) positioning said metal member within said array; and
(c) momentarily heating said member to a temperature above the working point of said glass, by passing a high current through said member for only a small fraction of a second, to cause said member to expand into contact with and heat relatively small surface portions only of said parts to fusing temperature, thereby fusing said surface portions to said member without softening the major portions of said parts.

4. The method of bonding a cylindrical refractory metal member to three external elongated parts of ceramic, comprising the steps of:
(a) supporting said parts in a circular array having an inscribed circle diameter slightly greater than the outer diameter of said member;
(b) positioning said metal member within said array; and
(c) momentarily heating said member to a temperature above the minimum fusing temperature of said ceramic, by passing a high current through said member for only a small fraction of a second, to cause said member to expand into contact with and heat relatively small surface portions only of said parts to fusing temperature, thereby fusing said surface portions to said member without softening the major portions of said parts.

5. The method of bonding a helix of refractory metal to a plurality of external longitudinal parts of refractory insulating material, comprising the steps of:
(a) supporting said parts in an array having a minimum inscribed circle diameter slightly greater than the outer diameter of said helix;
(b) positioning said helix within said array; and
(c) momentarily heating said helix to a temperature above the minimum fusing temperature of said material, by passing a high current through said helix for only a small fraction of a second, to cause said helix to expand into contact with and heat relatively small surface portions only of said parts to fusing temperature, thereby fusing said surface portions to the turns of said helix without softening the major portions of said parts.

6. The method of bonding a refractory metal helix to three external longitudinal parts of refractory insulating material, comprising the steps of:
(a) supporting said parts in a circular array having an inscribed circle diameter slightly greater than the outer diameter of said helix;
(b) positioning said helix within said array; and
(c) momentarily heating said helix to a temperature above the minimum fusing temperature of said material, by passing a high current through said helix for only a small fraction of a second, to cause said helix to expand into contact with and heat relatively small surface portions only of said parts to fusing temperature, thereby fusing said surface portions to said helix without softening the major portions of said parts.

7. The method of bonding a refractory metal helix to three external longitudinal supporting parts of refractory insulating material, comprising the steps of:
(a) supporting said parts in spaced parallel relation in a circular array having an inscribed circle diameter slightly greater than the outer diameter of said helix, with two parts in a horizontal plane below the other part;
(b) positioning said helix on said two parts and spaced slightly from the other part; and
(c) momentarily heating said helix to a temperature above the minimum fusing temperature of said material, by passing a high current through said helix for only a small fraction of a second, to cause said helix to expand into contact with said other part and to heat relatively small surface portions only of said parts to fusing temperature, thereby fusing said surface portions to the turns of said helix without softening the major portions of said parts.

8. The method of making a traveling wave tube having an elongated helix of refractory metal rigidly mounted within an elongated tubular envelope section of refractory insulating material having at least two longitudinal internal ribs equally spaced around said section and having a minimum inscribed circle diameter slightly greater than the outer diameter of said helix, comprising the steps of:
(a) supporting said envelope section;
(b) positioning said helix within said section; and
(c) momentarily heating said helix to a temperature above the minimum fusing temperature of said material, by passing a high current through said helix for only a small fraction of a second, to cause said helix to expand into contact with and heat relatively small surface portions only of said ribs to fusing temperature, thereby fusing said surface portions to the turns of said helix without softening the major portions of said ribs.

9. The method of making a traveling wave tube having an elongated helix of refractory metal rigidly mounted within an elongated tubular envelope section of glass having three longitudinal internal ribs equally spaced around said section and having an inscribed circle diameter slightly greater than the outer diameter of said helix, comprising the steps of:
(a) supporting said envelope section horizontally with two of said ribs on the lower half thereof;
(b) positioning said helix within said section and resting on said two ribs;
(c) pre-heating said helix and section slowly to a temperature between the strain point and the softening point of said glass;
(d) momentarily heating said helix to a temperature above the working point of said glass, by passing a high current through said helix for a period less than a tenth of a second, to cause said helix to expand into contact with the other rib and to heat relatively small surface portions only of said ribs to fusing temperature, thereby fusing said surface portions to the turns of said helix without softening the major portions of said ribs; and
(e) cooling said helix and envelope section very slowly to a temperature below the strain point of the glass, to anneal said glass.

10. An electrode-insulator mount comprising:
(a) a refractory metal electrode;
(b) a plurality of elongated parts of refractory insulating material extending along the outside of said electrode;
(c) said electrode being spaced from and rigidly connected to each of said parts by at least one relatively small pedestal of the material of said parts integral with said part and fused to said electrode.

11. An electron tube comprising:
(a) an envelope containing an elongated helix of refractory metal; and
(b) means supporting said helix within said envelope comprising at least two elongated parts of refractory insulating material extending longitudinally along the outside of said helix;
(c) each turn of said helix being spaced from and rigidly connected to each of said parts by a small pedestal of the material of said parts integral with said part and fused to said helix turn.

12. A traveling wave tube comprising:
(a) an envelope including an elongated tubular section of refractory insulating material having at least two integral longitudinal internal ribs; and
(b) an elongated helix of refractory metal mounted within said section;
(c) each turn of said helix being spaced from and rigidly connected to each of said ribs by a small pedestal of the material of said ribs integral with said rib and fused to said helix turn.

13. A traveling wave tube comprising:
(a) an envelope including an elongated tubular section of glass having three integral longitudinal ribs equally spaced around in inner wall thereof; and
(b) an elongated helix of refractory metal mounted within said section;
(c) each turn of said helix being spaced from and rigidly connected to each of said ribs by a small pedestal of glass integral with said rib and fused to said turn.

14. A traveling wave tube comprising:
(a) an envelope including an elongated tubular section of glass having three integral longitudinal ribs equally spaced around in inner wall thereof; and
(b) an elongated helix of refractory metal mounted within said section;
(c) each turn of said helix being spaced from and rigidly connected to each of said ribs by a small pedestal of glass integral with said rib and fused to said turn;
(d) said pedestals having a width less than the wire diameter of said helix turns.

15. The method of claim 5 wherein, in step (c), after expanding and fusing to said surface portions, said helix contracts on cooling to form small pulled pedestals of said insulating material which are fused to and rigidly support said member with minimal contact with said parts.

References Cited by the Examiner

UNITED STATES PATENTS

| | | | |
|---|---|---|---|
| 1,234,973 | 7/1917 | Trood | 65—40 |
| 2,452,582 | 11/1948 | Litton | 174—50.53 |
| 2,462,205 | 2/1949 | Matchlett et al. | 65—40 |
| 2,584,802 | 2/1952 | Hansell | 315—3.5 |
| 2,610,308 | 9/1952 | Touraton et al. | 315—3.5 |
| 2,660,690 | 11/1953 | Breeden et al. | 315—3.5 |
| 2,694,273 | 11/1954 | Spyut | 65—40 |
| 2,790,962 | 4/1957 | Morton | 315—3.5 |
| 3,061,664 | 10/1962 | Kegg | 174—50.53 |
| 3,119,043 | 1/1964 | Karol | 315—3.5 |

DONALL H. SYLVESTER, *Primary Examiner.*

GEORGE N, WESTBY, V. LAFRANCHI, G. R. MYERS, *Assistant Examiners.*